United States Patent [19]

Cowler et al.

[11] Patent Number: 4,711,420
[45] Date of Patent: Dec. 8, 1987

[54] BRACKET AND POST ASSEMBLY

[75] Inventors: David J. W. Cowler, London, England; Peter R. Lewis, 5 Station Road, Berkhamsted, Hertfordshire, England

[73] Assignees: Kenneth B. Fether; Richard Miles; Anthony Rostron; Peter R. Lewis, all of Hertfordshire, England

[21] Appl. No.: 731,876

[22] Filed: May 8, 1985

[30] Foreign Application Priority Data

May 10, 1984 [GB] United Kingdom ............... 8411943

[51] Int. Cl.$^4$ ............................................. A47B 57/20
[52] U.S. Cl. ................................. 248/243; 248/224.4; 403/254
[58] Field of Search .............. 248/243, 235, 220.2, 248/222.4, 223.4, 224.4, 225.1; 403/255, 253, 254; 108/106, 108, 109, 144

[56] References Cited

U.S. PATENT DOCUMENTS 3,275,394  8/1964  Massinger .
3,561,715  2/1971  Klein .................................. 248/243
4,457,239  7/1984  Heinze .............................. 108/109

FOREIGN PATENT DOCUMENTS 4196      9/1979  European Pat. Off. ............ 248/243
3404737   8/1985  Fed. Rep. of Germany .
706657    6/1931  France .
2253395   6/1975  France .
2395678   1/1979  France .
431853    9/1967  Switzerland ....................... 108/109
541942   11/1973  Switzerland .

Primary Examiner—Reinaldo P. Machado
Assistant Examiner—Alvin Chin-Shue
Attorney, Agent, or Firm—Parkhurst & Oliff

[57] ABSTRACT

A bracket and post assembly suitable for shopfitting provides means for supporting a shelf by means of a single post and a cantilever bracket. The post and bracket are engageable by complementary interfitting means. On the post there are alternate vertically spaced outer and inner supports in the form of angled pieces, being formed by pressing outwardly to greater or lesser extents from a single sheet. The bracket has diverging arms 45 and at its root region a pair of slots, one in each arm, shaped to provide a hook at its root. An outer support is received in the bracket slots and the bracket is hooked thereto. The bracket is supported above and below by respectively the outer and inner supports acting as buttresses against the cantilever forces. The assembly is particularly secure against the peeling effect of a load and resistant to rattling or looseness.

9 Claims, 12 Drawing Figures

BRACKET AND POST ASSEMBLY

DESCRIPTION

This invention relates to a bracket and post assembly.

In addition to other areas, the invention may be used in shopfitting systems, particularly in such systems in which a single vertical post is required to support in a cantilevered manner, shelving and other display fittings. A shelf can be supported from a single vertical post by means of a bracket, detachably secured to the post, having limbs diverging to support the shelf at their ends. In such an arrangement there is considerable leverage exerted on the bracket, and if a conventional, hooked shelf-support bracket is used it would tend to peel out of engagement with the post, or alternatively to buckle the supporting walls of the post. Furthermore, without the assistance of a second post, conventional brackets allow an unacceptable amount of lateral movement, and tend to rattle in their slotted engagement with the post.

In European Patent Specification No. 0 004 196 a bracket assembly is described in which a rear buttress for a bracket is provided by a channel-shaped indentation on the rear wall of a hollow post. While this may positively locate the rear of the bracket, it does not sufficiently resist lateral movements to make such a construction suitable for fixing cantilevered shelving to a single upright.

The present invention seeks to provide a more secure bracket and post assembly which can withstand the leverage forces of a cantilevered shelf, and is resistant to lateral movement, and can be manufactured simply and economically.

According to the present invention, there is provided a bracket and post assembly comprising a post adapted for use in an upright disposition, and a bracket detachably securable to the post.

The post (30) and bracket (31) include complementary engagement means, comprising, on the post, longitudinally successive support portions and alternate support portions, constituting outer support portions (33), and a wall outward of the axis of the post and extending between two positions on the post and the alternate support portions, constituting inner support portions (34), each iner support portions comprising an angled or curved wall extending between two positions on the post.

The complementary engagement means further comprises, on the bracket, a pair of angled walls (45) diverging from the root portion of the bracket, each of the angled walls having an engagement slot, the two engagement slots joining at the root of the bracket to enable the slots to receive one of the outer support portions of the post, the lower edge surface of said angled walls of the bracket and upper edge surface of the wall of the outer support portion being relatively contoured such that upon full introduction of the outer support portion into said engagement slot, the bracket drops through a portion of its height so that its angled walls rest on the upper edge surface of the wall of the outer support portion.

The bracket further includes, at its root below said slots, an angled or curved engagement wall (44) adapted to mate with the outer surface of the complementary shaped inner support portion (34) of the post, to provide a rear buttress.

Above the slot, at least two surfaces contact the rear surface of the received outer support portion (33), said two contact surfaces being disposed so as to be subject to relatively orthogonal support forces through this contact.

It should be understood that the resistance to peeling forces arising from the cantilevered load comes from the effect of the rear buttress and the effect of the two surfaces of the bracket abutting the rear (i.e. facing inwardly towards the post) surface of the outer surface portion.

These two surfaces may be the vertical edge surfaces of a recess in the lower edge of the angled walls of the bracket, which recess also constitutes the contouring which enables the bracket to drop when inserted.

Alternatively, or additionally, the two contacting surfaces may be provided by the outer-facing surface of a further angled or curved engagement wall of the bracket, located above said slots. These contacting surfaces may in fact be part of a continuous mating surface co-extensive with the surface on the outer support member which it contacts.

Two of the contacting surfaces howsoever provided, are subject to orthogonal support forces. This feature gives lateral stability to the assembly. It will be appreciated by one skilled in the art that although ideally the support forces should be at about 90°, some small departures from the exact angle may be made, and somewhat larger departures may be made at some expense to stability. The term 'orthogonal' as used herein should be understood as a general practical guide and not a methematically absolute term.

It will be appreciated that the bracket can be presented horizontally to the post and will drop into place vertically. In this manner it is possible to secure a bracket to the post directly beneath an existing bracketed fitting.

In a preferred embodiment of the invention, the inner support portions of the post extend laterally outward from the post and have a lateral extent less than the outer support portions The inner support portions may be portions of a continuous tubular member constituting the radial inner part of the assembly.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

Figure 1:
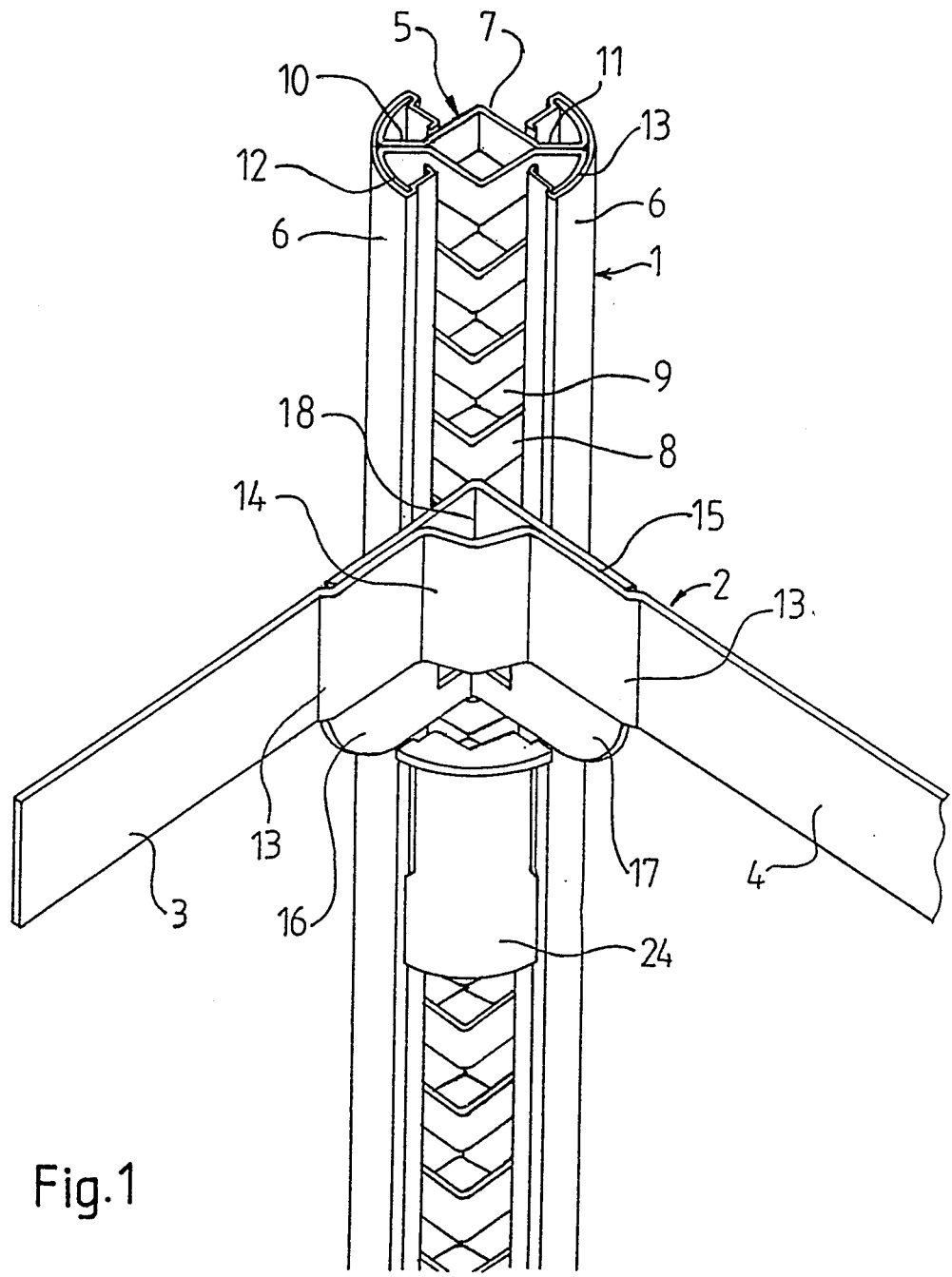
FIG. 1 is a perspective view of a bracket and post assembly accordance with the invention, shown in a disassembled state.

Referring to FIG. 1, the post and bracket assembly comprise an upright post 1 with horizontal slots at vertically spaced intervals, and a bracket 2 comprising a pair of orthogonal limbs 3 and 4 diverging from a post-engaging portion.

The upright post 1 comprises a central spine 5 with outer casings 6. The central spine 5 is constituted by two identical sheet metal pressings joined back to back longitudinally. Each of these pressings comprises a central outwardly-angled portion 7 with its apical region bent inwards at regular intervals thus providing alternatively, projecting and recessed angle portions 8 and 9. These constitute outer and inner support portions for the bracket. Each of these angle portions 8, 9 is spaced from the next by a narrow horizontal slot. Each angle portion 8 comprises two vertical walls meeting along a vertical fold line at a right angle. The central spine 5 of the post further includes elongate web portions 10 and 11 extending laterally from opposite longitudinal edges of the angled portion 7. At the remote ends of the web portions 10, 11 is a respective circularly-arcuate flange portion 12, 13 shaped to conform with the outer casing 6. The two parts of the central spine are joined by juxtaposing the corresponding web portions 10 and 11 and welding through this juxtaposed region. The arcuate portions 12 and 13 are thus disposed continuously with the adjacent arcuate portion of the other part of the central spine.

The parts of the outer casing 6 are located around the adjacent pairs of arcuate flanges 12 and 13.

Figure 2:
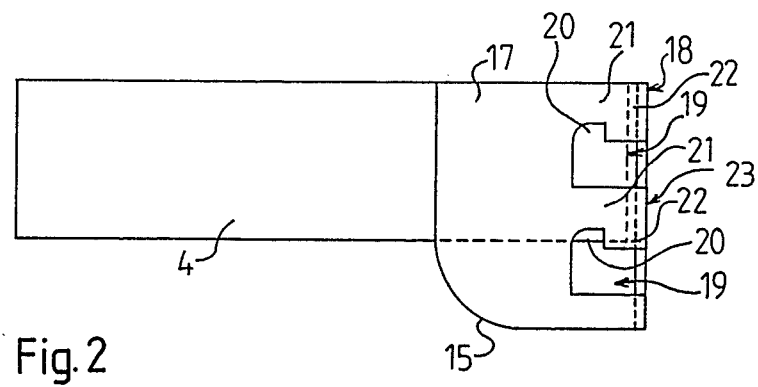
FIG. 2 a view in elevation of the bracket shown in FIG. 1.
Figure 3:
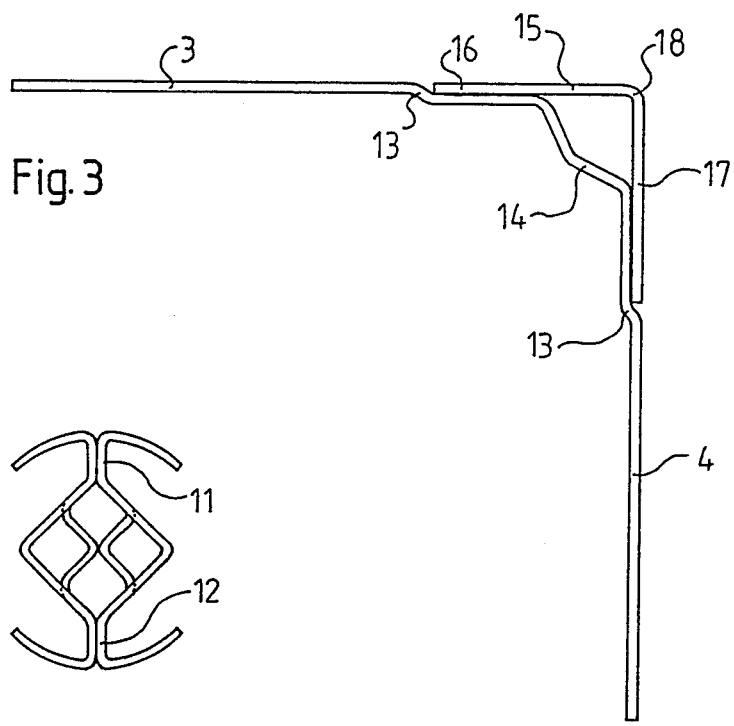
FIG. 3 is a plan view of the bracket.

Referring additionally to FIGS. 2 and 3, the limbs 3 and 4 of the bracket 2 have an inwardly directed step 13 near their proximal ends. The limbs continue in planar portions until their junction region, where they are reflexively folded to provide an outwardly protruding angle portion 14.

A further angle piece 15 has perpendicular limbs 16 and 17 and sits about the exterior of the folded portion of the joint between the main limbs 3 and 4. The limbs 16 and 17 are adjacent the planar portions of the limbs 3 and 4 that are recessed by the steps 13. The depth of each step is approximately equal to the thickness of the limbs 16 and 17 so that the angle piece 15, when joined to the rest of the bracket, effectively provides a continuation of the limbs 3 and 4. The limbs 16 and 17 meet perpendicularly along a fold 18. The limbs 16 and 17 of the angle piece 15 extend below the lower edge of the limbs 3 and 4. The forward edge surface of the parts of the limbs 16 and 17 beneath the limbs 3 and 4 are cut away in a convex curve.

Each of the limbs 16 and 17 of the angle piece 15 has two vertically-spaced slots 19. The slots extend to the fold line 18, and corresponding slots on each of the limbs 16 and 17 are effectively continuous with each other and symmetrical about the fold line 18. Each slot 19 comprises a rectangular portion extending rearward from the fold line 18 with an upper extension 20 at the end of the slot remote from the fold line 18. The slot extension 20 has vertical wall nearest the fold line 18 and a curved wall remote from the fold line 18. Each slot 19 thus defines above it a tongue portion 21 continuous with, and perpendicular to, a corresponding tongue portion on the other limb. Each tongue portion has, by virtue of the slot extension 20, an overhanging portion 22, which together with the overhanging portion of the corresponding tongue on the other limb presents a right angled hook 23.

The tongues 21 and in particular the right angled hooks 23 provide the engagement means whereby the bracket is engaged with the upright post 1 and can be supported in cantilever fashion. To locate the bracket, it is presented perpendicularly to the post so that the outwardly facing angle portions 8 of the central spine of the post are inserted into the space between two projecting angle portions 8 of the bracket. When fully inserted, the bracket drops down until the upper edges of the outward angled portions 8 of the post engage the top wall of the upper extensions 20 of the slots 19. It will be appreciated that each angle portion 8 of the post received in a slot 19, by virtue of its two angled walls fits in the upward extensions 20 of the slot 19 on both limbs 16 and 17 of the bracket. The bracket is retained in this position against movement outward of the post by virtue of the hook 23; with each of the overhanging portions 22 being perpendicular to the respective wall of the angle portion 8 with which it is engaged.

Portions of the limbs 16 and 17 of the bracket adjacent the fold 18 extend within the confines of the post 1 and the fold 18 abut against the vertical fold of the recessed angle portions 9 of the central spine of the post. This provides a butress. Forward tilting motion of the bracket is prevented by the rear abutment of the lowermost fold portion of the bracket and by the vertical wall of each of the overhanging portions 22 in contact with the rear of the angle portion 8. Upward tilting is prevented by the rear abutment of the uppermost fold portion of the bracket. The forward ridges of the projecting angle portions 8 of the central spine 5 are received in the outwardly protruding angle portion 14 of the bracket, the outward fold of the angle portion 8 sitting against the inner surface of the fold of the angle portion 14. This provides positive location and further security against tilting.

Since the engagement of an angle portion 8 of the spine in the slots 19 on respective limbs of the bracket takes place at two locations which are perpendicularly opposed, horizontal displacement, through pivotal movement about a vertical axis, is prevented. The resultant composite engagement provides a very stable and secure cantilevered support for the bracket against movement or rattling in any direction.

Figure 4:
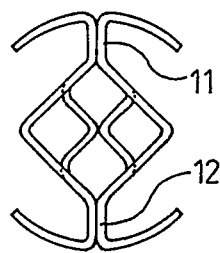
FIG. 4 is a radial section of the post illustrating its fabrication.
Figure 5:
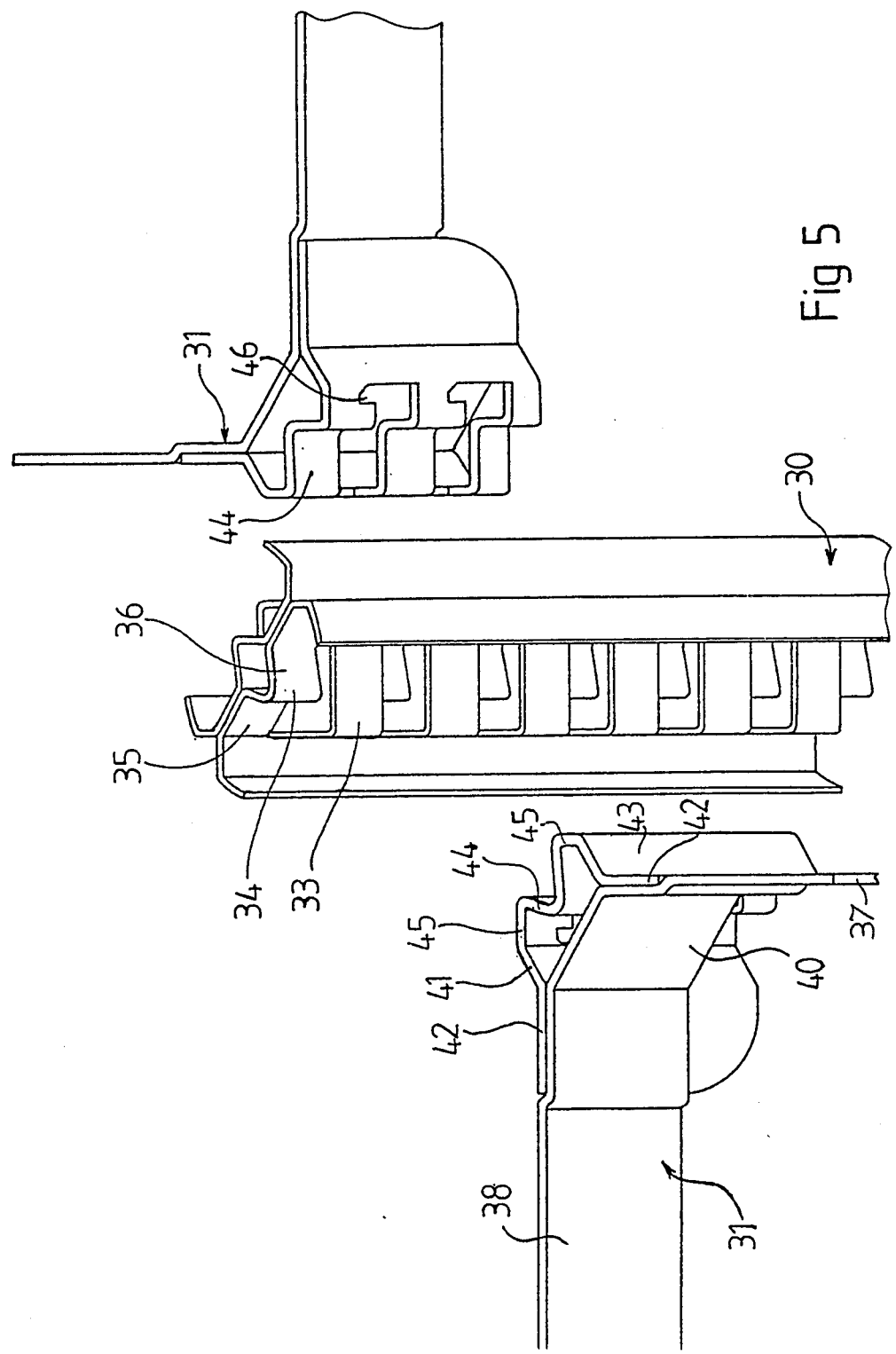
FIG. 5 is a perspective view of a bracket and post assembly constituting a further embodiment of the invention, shown in a disassembled state.
Figure 6:
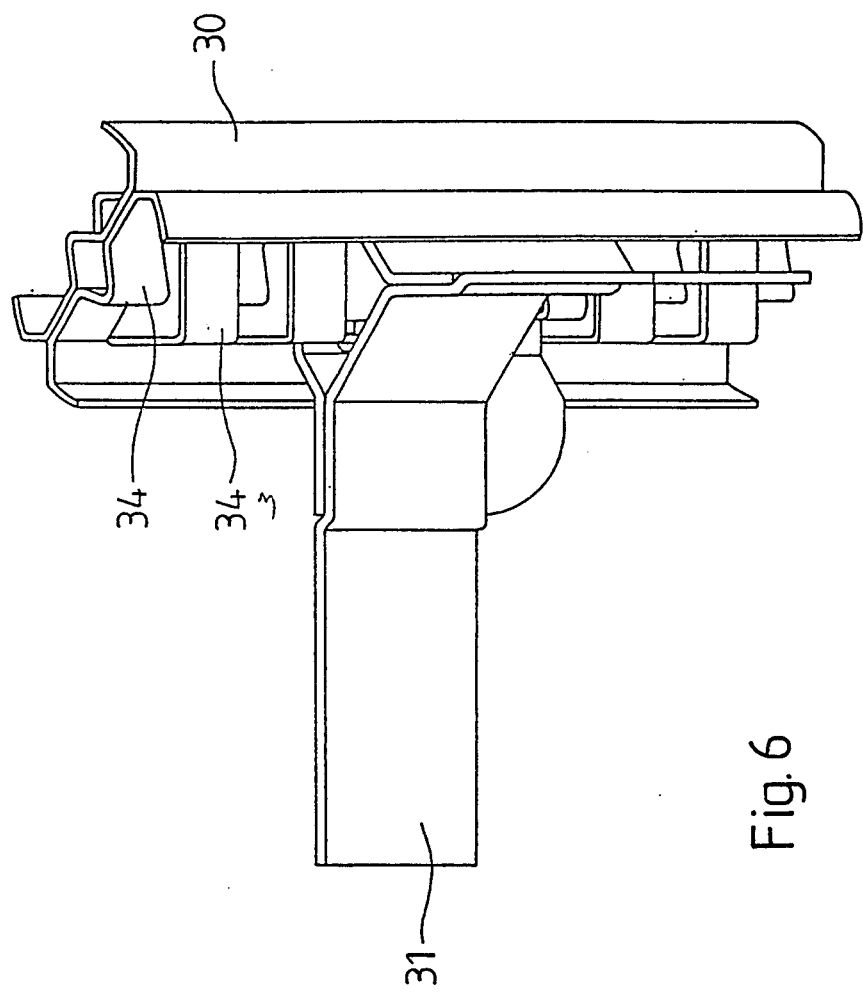
FIG. 6 is a perspective view of the assembled bracket and post of FIG. 5.
Figures 7A, 7B:
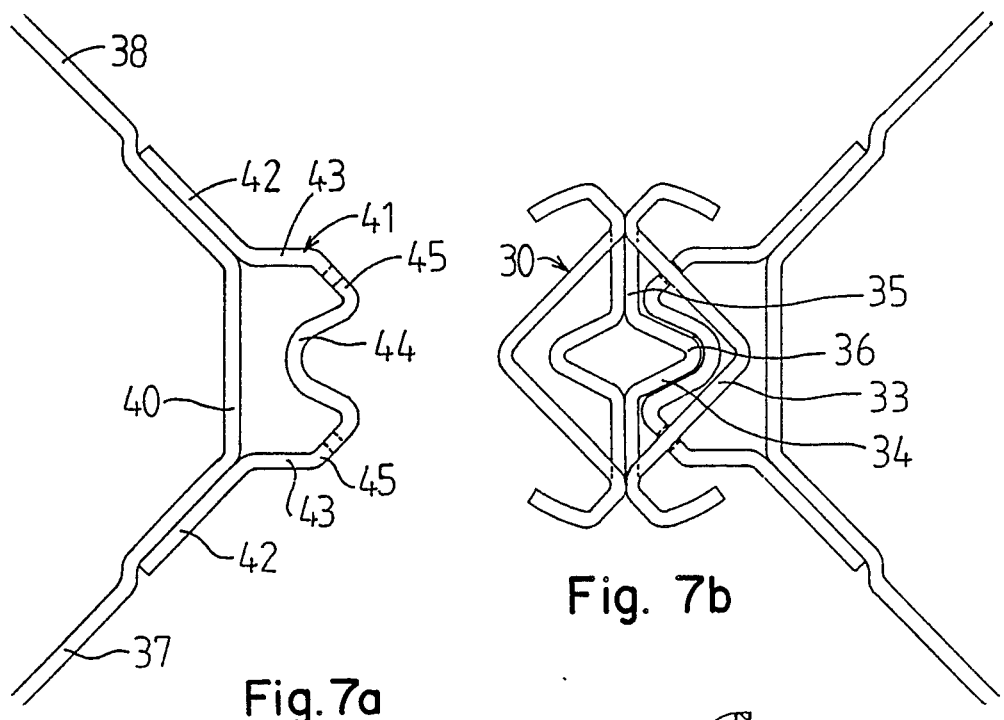
FIG. 7a and 7b are radial section views of the post; with one bracket assembled and another bracket separated.
Figures 8A, 8B:
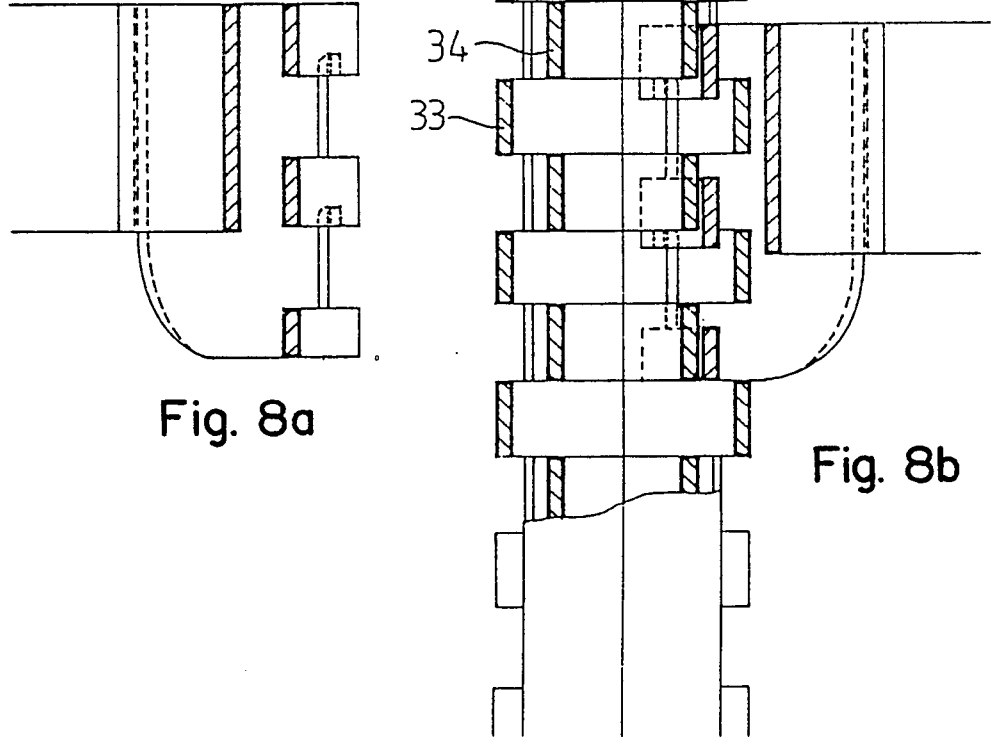
FIG. 8a and 8b are axial views of the assembly in the disposition shown in FIG. 7.

In addition to the effectiveness of the bracket assembly in providing a rigid cantilevered support, it is also important that the assembly, and in particular the upright post, can be manufactured by a simple and inexpensive process. The upright post 1 is made from two rolled steel sections. The transverse slots are punched out at equal vertical spacings along the length of the section. Alternate triangular-sectioned webs of metal between the slots are pressed inwardly at their apexes. As illustrated in FIG. 4, the two rolled steel sections are then connected back to back and spot welded along their juxtaposed portions 11 and 12, so that the post may be used from either side.

The outer casings 6 are made by a dual-density PVC extrusion, the curved walls being relatively stiff, but with resiliently flexible side flanges enabling them to be clipped over the flange portions 12, 13 of the spine of the post.

To complete the structure and provide a pleasing appearance, a plastic partial sleeve 24 has downwardly extending rear prongs (not shown) which fit on either side of the angle portions 8. The sleeve 24 clips into position over the internal angle of the brackets and provides a cylindrical surface to the post in the region of the bracket. These side flanges also extend inwardly at an angle of approximately 45° to form triangular cavities on either side of the zone occupied by the brackets. Within these cavities it is possible to carry electrical cables which, because of the flexible nature of the extended flanges, may be fed in or out at any point along the length of the post.

Referring now to FIGS. 5 to 8, in a further embodiment of the present invention a post 30 and bracket 31 include certain modifications of the post and bracket assembly described with reference to FIGS. 1 to 4. As may be seen from the Figures the post 31 is similar to the post 1 in that it includes two sections joined back to back, each section having an outer flange and a web portion juxaposed with the web portion of the other section. The spine of the post is also provided with vertically spaced folded portions. Alternate folded portions comprise outwardly projecting angle portions 33 similar to the outwardly projecting angle portions 8 in the previously described embodiment. Alternating with these angle portions 33 are backwall elements 34 having outer web portions 35 and a central folded ridge portion 36, projecting outwardly of the spine. With this construction there is no requirement for slots between the alternate folded portions of the spine as will be explained.

The brackets 31 comprise two orthogonal limbs 37 and 38 with an inward step, the two limbs being interconnected by an integral rectangular plate 40 so that the limbs are in the form of a truncated prism. In place of the angle piece 15 in the previously described embodiment the rear of the bracket is constituted by a channel section member 41 having two outer rectangular flanges 42 fitting over the inwardly stepped portions of the limbs 37 and 38. The flanges 42 are integral with a columnar portion having side walls 43 and an inwardly folded rear wall 44. The fold in the rear wall 44 is in the form of an inwardly directed ridge and the rear wall 44 meets with the side wall 43 via narrow angled intermediate walls 45.

The bracket has two composite transverse slots extending through the rear and intermediate walls 44 and 45 of the channel section 41, the slots thus having a corrugated periphery in accordance with the folds of the channel section member. At their extremities the slots have an additional upper cut-away portion 46 in the region of the intermediate walls 45. The region between the two upper cut-away portions 46 comprises a corrugated hook portion.

The bracket is presented to the post in the manner of the previously described embodiment. The perpendicular parts of the angle portion 33 fit into the transverse slots in the bracket and fit into the under-cut portions 46 so that the bracket is hooked onto them. The rear buttressing of the bracket is provided by the folded ridge portions 36 of the alternate parts of the spine of the post; these ridge portions abutting behind the inward folding rear wall 44 of the bracket. The part of the rear wall 44 of the channel member 41 facing inwardly towards the plate 40 also contacts the rear surface of an angle portion 33 so that the rear wall 44 is effectively trapped between these two walls.

It is to be noted that in this embodiment the buttress for the bracket is provided by a complimentary shaped back wall of the spine of the post on which the shaped rear wall 44 of the bracket abuts. This positive co-extensive location and further assures that the structure has rigidity that the bracket will not rattle within the slot.

This embodiment presents certain manufacturing advantages over the version described with reference to FIGS. 1 to 4. From the rolled steel section transverse cuts are made at the positions of the boundaries of the alternate folded portions of the post. Alternate portions, thus defined, are punched inwardly at their outer regions with a pinching effect at their central regions. It will be appreciated that this, unlike the previously described embodiment, does not involve reversing a fold, and so the stresses on the material are reduced. Furthermore, the portions that are punched inwardly are moved from an angled state to a flat state, rather than to a reverse angled state, and this lessens the stress between the alternate portions. As a result, it is unnecessary to stamp out slots between the portions.

Figure 9:
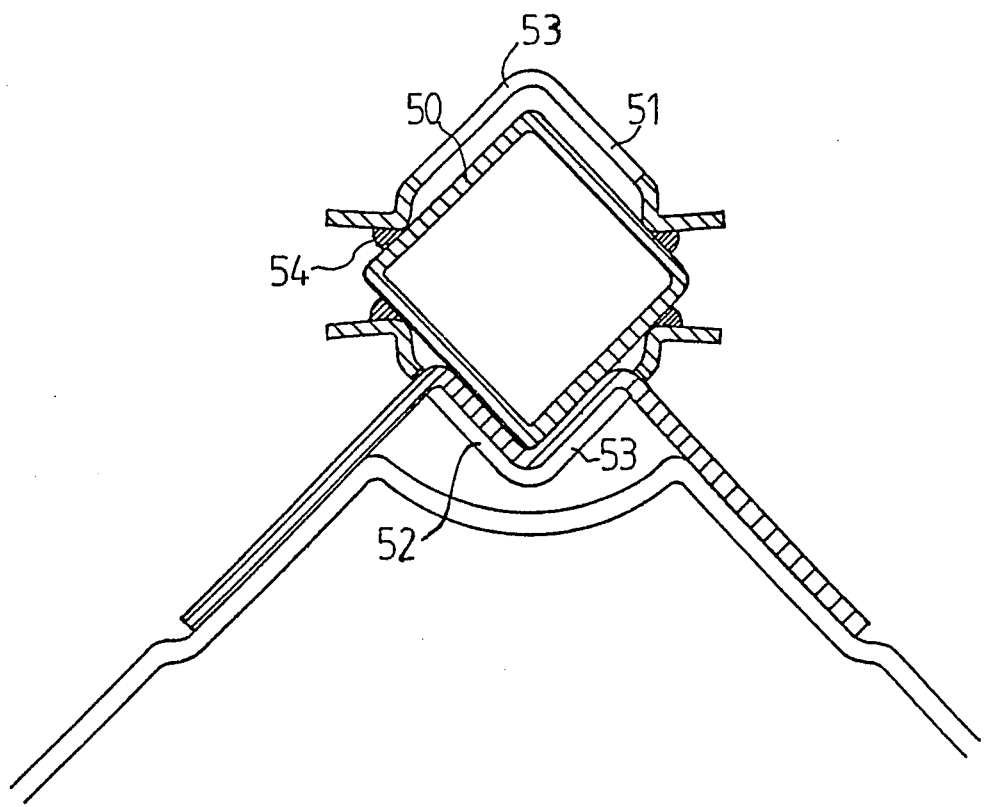
FIG. 9 is a radial section view of a post and bracket in accordance with a further embodiment.

FIG. 9 shows a further embodiment of the invention in which the spine of the post is formed from three parts. A first part comprises an inner tube 50 of rectangular cross-section outside which are arranged two sheet metal pierced and rolled sections 51, 52 having spaced projecting angle portions 53. Between the angle portions 53 are spaces formed by removing rectangular pieces from the pressings. Thus, in comparison with the embodiment shown in FIGS. 5-8, the backwall elements 34 are omitted and replaced by slots in the sections 51, 52. The rear buttress is provided instead by the inner tube 50 which is accessible through the slots between the angle portions 53. The sections 51, 52 are welded to the inner tube 50 in the assembled post e.g. at 54.

Figure 10:
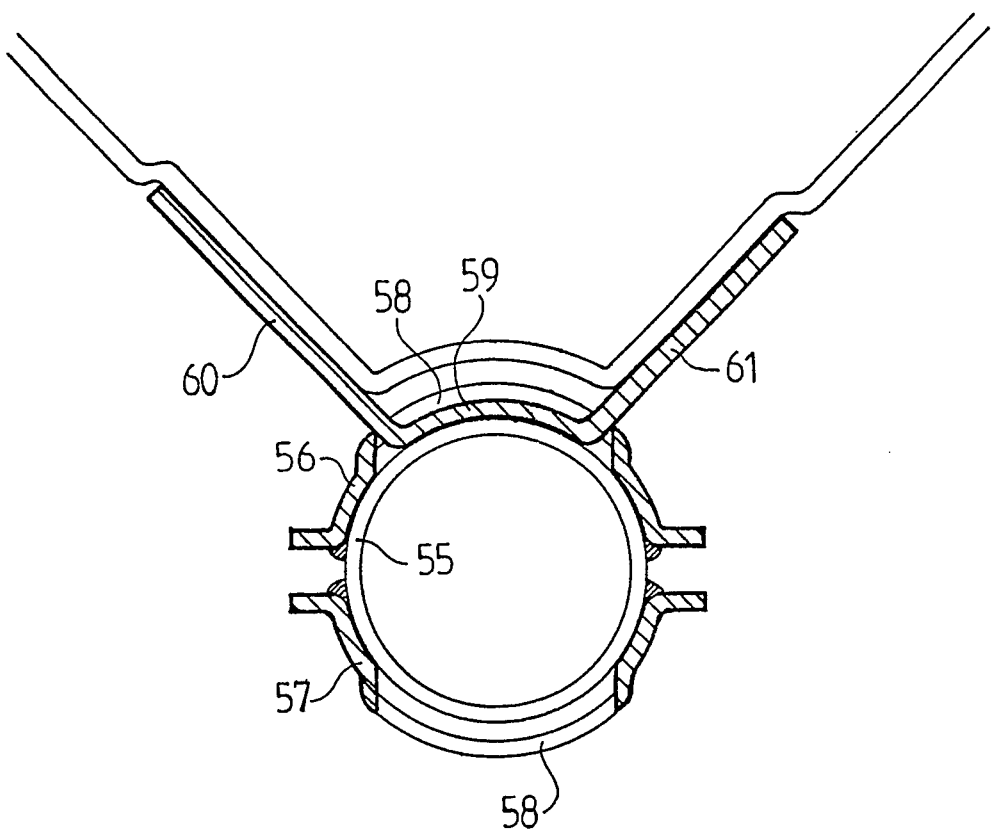
FIG. 10 is a radial section view of a post and bracket employing curved mating walls in accordance with a further embodiment.

FIG. 10 shows a further embodiment in which the mating angled portions of the post and bracket of the embodiments of FIG. 9 are replaced by circularly curved walls. The inner tube 55 is cylindrical and the sections 56 and 57 have circularly-curved portions 58 concentric with the cylinder 55. Thus, the outer supports for the bracket previously constituted by the angle portions are each now in the form of a curved wall, and the root wall 59 of the bracket is also curved to mate with the surface of the cylinder 55. Nonetheless, the diverging limbs 60 and 61 of the bracket are still located by abutment forces at the post portion 58 which act perpendicularly and provide a high degree of stability.

In the embodiments of the invention described above the bracket is hooked over the support portions of the post by means of a shaped slot in the bracket. Alternatively, the upper edge surfaces of the outer support portions, e.g. the angle portion 9 in FIG. 1 may be stepped so that they are at a lower height nearer the post effectively to provide an upstanding hook on the post. The slots in the bracket need then only be rectangular.

We claim:

1. A bracket and post assembly comprising a post adapted for use in an upright disposition, and a bracket detechably securable to the post, the post and bracket including complementary engagement means, comprising, on the post, longitudinally successive support portions having alternate support portions constituting outer support portions, and a wall outward of the axis of the post and having a rear contacting surface extending between two positions on the post and other alternate support portions, constituting inner support portions, each comprising an angled wall extending between two positions on the post;

the complementary engagment means further comprising, on the bracket, a pair of angled walls diverging from a root portion of the bracket, each of the angled walls having an engagement slot, the two engagement slots joining at the root portion of the bracket to enable the slots to receive one of the outer support portions of the post, the angled walls of the bracket having a lower edge surface and the wall of the outer support portion of the post having an upper edge surface, said lower edge surface and said upper edge surface being relatively contoured such that upon full introduction of the outer support portion into said engagement slot, the bracket drops through a portion of its height so that its angled walls rest on the upper edge surface of the wall of the outer support portion, the bracket further including at its root, at least below said slots, an angled or curved engagement wall adapted to mate with an outward-facing mounting surface of the complementary shaped inner support portion of the post, to provide a rear buttress, and said slots having at least two surfaces contacting a rear surface of the received outer support portion, said contacting surfaces being disposed so as to be subject to generally, relatively, orthogonal support forces through this contact.

2. A bracket and post assembly as claimed in claim 1 wherein the bracket includes above said slots a further angled or curved engagement wall adapted to mate with the outward-facing mounting surface of a further complementary-shaped inner support portion of the post to provide a further rear buttress.

3. A bracket and post assembly as claimed in claim 1, wherein said at least two surfaces on the bracket contacting the rear surface of the received outer support portion are each provided by an edge surface adjacent a respective recess in a respective one of the lower edge surfaces of the angled walls of the bracket.

4. A bracket and post assembly as claimed in claim 1 wherein the bracket includes a plurality of said pairs of engagement slots, vertically-spaced, enabling the bracket to receive a corresponding number of the outer support portions of the post.

5. A bracket and post assembly as claimed in claim 1 wherein:
the inner support portions of the post extend laterally outward of the post and have a lateral extent less than the outer support portions,
and the engagement wall of the bracket is correspondingly shaped.

6. A bracket and post assembly as claimed in claim 5 wherein:
the inner support portions are parts of a continuous tube located within an outer tubular structure containing said outer support portions.

7. A bracket and post assembly as claimed in claim 5, wherein the inner and outer support portions of the post are respectively alternate outwardly extending angled portions made of the same piece of material.

8. A bracket and post assmebly as claimed in claim 1, wherein:
the inner support portions of the post extend laterally inwards of the post, and the engagement wall of the bracket is corresponding shaped.

9. A bracket and post assembly as claimed in claim 8, wherein the inner and outer support portions of the post are respectively alternate inwardly and outwardly extending angled portions made of the same piece of material.

* * * * *